United States Patent [19]

Yanaki et al.

[11] Patent Number: 4,965,354

[45] Date of Patent: Oct. 23, 1990

[54] PROCESS FOR PRODUCING A CONDENSED POLYSACCHARIDE

[75] Inventors: Toshio Yanaki; Shigeki Maehata, both of Kobe; Tomoko Satoh, Sakai; Shinji Ikeda, Kobe, all of Japan

[73] Assignee: Taito Company, Ltd., Tokyo, Japan

[21] Appl. No.: 161,170

[22] Filed: Feb. 26, 1988

[51] Int. Cl.$^5$ .................. C07H 1/00; C08B 37/00; C08B 1/00; A23L 1/00; A61K 31/00
[52] U.S. Cl. .................. 536/124; 536/4.1; 536/1.1; 536/126; 514/54; 426/804
[58] Field of Search .................. 536/124, 4.1, 1.1; 514/54; 426/804

[56] References Cited

U.S. PATENT DOCUMENTS

| | | |
|---|---|---|
| 4,464,530 | 8/1984 | Matsumura et al. ............... 536/124 |
| 4,579,942 | 4/1986 | Brode et al. ............... 536/84 |
| 4,614,733 | 9/1986 | Yoshikumi et al. ............... 536/1.1 |
| 4,774,093 | 9/1988 | Provonchee et al. ............... 536/4.1 |

*Primary Examiner*—Ronald W. Griffin
*Assistant Examiner*—Everett White
*Attorney, Agent, or Firm*—Oblon, Spivak, McClelland, Maier & Neustadt

[57] ABSTRACT

A process for producing a condensed polysaccharide, which comprises heat-melting at least one compound selected from the group consisting of glucose, mannose, galactose, xylose and arabinose, which contains from 8 to 180 ppm of hydrogen chloride, followed by dehydration condensation under reduced pressure.

6 Claims, No Drawings

PROCESS FOR PRODUCING A CONDENSED POLYSACCHARIDE

BACKGROUND OF THE INVENTION

Field of the Invention

The present invention relates to a process for producing a condensed polysaccharide. More particularly, the present invention relates to a process for producing a condensed polysaccharide useful for a wide range of food products by subjecting one or more compounds selected from the group consisting of glucose, mannose, galactose, xylose and arabinose as starting material to dehydration condensation under reduced pressure in the presence of a very small amount of hydrogen chloride as a catalyst. The condensed polysaccharide obtained by the present invention is tasteless or slightly sweet, white or slightly yellow and odorless, and its aqueous solution shows pH 4-6 at 10% by weight, since the hydrogen chloride catalyst is eventually removed from the system under reduced pressure during the reaction. Further, the product is stable within a wide pH range and under heat or in the presence of various decomposing enzymes concerned with digestion in a living body. Therefore, when it is used as a substitute for e.g. sugar in general food products, it is possible to prepare inexpensive low calorie food products.

DISCUSSION OF THE BACKGROUND

Low calorie food products are useful when it is required to control the intake of carbohydrate or to keep the calorie at a low level. As one of the methods for producing such food products, it is conceivable to substitute a low calorie saccharide for sugar in the food products. For example, a low calorie saccharide may be added as an extender or filler to various synthetic or natural sweetening agents to obtain diet sweeteners, or a low calorie saccharide may be added as an excipient to spray dried food products. In such cases, the addition of such a low calorie saccharide should not affect the flavor, taste or outer appearance of the products. Low calorie saccharides presently available in the food industry have many problems with respect to costs or their properties.

There have been attemps since long ago to synthesize polysaccharides by directly condensing monosaccharides. Syntheses of polysaccharides are generally classified into three categories i.e. a hydrolytic reverse reaction method, a melting method and a solvent method. So long as monosaccharides are used, the resulting products will be low calorie saccharides having no structural regularity and being hardly decomposable by various decomposing enzymes irrespective of the type of the method employed.

Among these methods, the hydrolytic reverse reaction method is usually poor in the yield. With the solvent method, it is necessary to remove the solvent after the reaction. Therefore, these two methods are not suitable for the production of low calorie saccharides from the viewpoint of costs.

In this respect, the melting method is advantageous wherein saccharides as starting material are melted at a temperature higher than the melting points thereof and dehydrated for condensation in vacuum or in an inert gas stream at a high temperature. The reaction in vacuum at a high temperature is particularly advantageous over the reaction in the inert gas stream, since the decomposition or coloring of the starting material saccharides is thereby minimum. The melting method in vacuum at a high temperature has been attempted in various manners. With respect to glucose which is most inexpensive as the starting material, there have been reported a method by Sugisawa et al. wherein the starting material is melted and subjected to dehydration condensation without any catalyst (H. Sugisawa et al., J. Food Sci., 31, 561 (1966)), a method by Mora et al. wherein phosphorous acid is used as a catalyst (P. T. Mora et al., J. Am. Chem. Soc., 82, 3418 (1960)), a method by O'Colla et al. wherein a strongly acidic resin is used as a catalyst (P. S. O'Colla et al., J. Chem. Soc., 2351 (1964)), a method by Kent wherein thionyl chloride is used as a catalyst (P. W. Kent, Biochem. J., 55, 361 (1953)) as well as a method wherein an inorganic catalyst such as phosphorus trichloride, phosphorus pentachloride, phosphorus pentoxide, concentrated sulfuric acid, metaboric acid or zinc chloride is used, and a method wherein an organic catalyst such as citric acid, fumaric acid, tartaric acid or succinic acid is used.

However, when application to food products is taken into account, some of the catalysts are not suitable for food products. In these methods except for some cases, a non-volatile acid is used as the catalyst, and there is a problem that such a catalyst remains in the reaction product in a substantial amount, whereby the product tends to have an acidic taste, or it will be required to remove or neutralize the residual acid catalyst. On the other hand, when various decomposing enzymes concerned with digestion in a living body such as $\alpha$-amylase, $\beta$-amylase, glucoamylase, isoamylase, prulanase, amyloglucosidase and the like, are applied to various condensed polysaccharides obtained from glucose by the above-mentioned various methods, the condensed polysaccharides are likely to be hydrolyzed to some extent, as some of them will be exemplified in Examples hereinafter, and they are hardly suitable as low calorie saccharides. As a reason for this, it may be mentioned that in view of their specific rotatory power, $\alpha$-bonding is predominant over $\beta$-bonding as the bonding type of glucose molecules.

When application to food products is taken into account, it is desired to provide condensed polysaccharides at low costs which are free from catalysts and which are hardly decomposable by digestive enzymes. The present invention is concerned with a new melting method developed to solve such problems.

SUMMARY OF THE INVENTION

There has been no instance reported wherein a volatile acid such as hydrogen chloride is used as a catalyst for a melting method conducted in vacuum at a high temperature. This is probably because it used to be believed that such a volatile acid would evaporate before the reaction in vaccum at a high temperature and because conventional methods are intended primarily to obtain condensed polysaccharides of higher molecular weights. Whereas, the present inventors have studied the dehydration condensation reaction of glucose, mannose, galactose, xylose and arabinose by a melting method in vacuum at a high temperature from the viewpoint of low calorie and have found it possible to produce condensed polysaccharides which are more hardly decomposable by various decomposing enzymes concerned with digestion in a living body than condensed polysaccharides prepared by the conventional melting methods, in a yield of 80% or higher, by using a very small amount of hydrogen chloride as a catalyst. Besides, the very small amount of hydrogen chloride is eventually removed under vacuum our of the system to leave the condensed polysaccharides only. Thus, it has been made possible to produce low calorie saccharides having excellent quality at low costs.

Namely, the present invention provides a process for producing a condensed polysaccharide, which comprises heat-melting at least one compound selected from the group consisting of glucose, mannose, galactose, xylose and arabinose, which contains from 8 to 180 ppm of hydrogen chloride, followed by dehydration condensation under reduced pressure.

DETAILED DESCRIPTION OF THE PREFERRED EMBODIMENTS

Now, the present invention will be described in detail with reference to a case where glucose is used as the starting material.

Firstly, glucose and hydrogen chloride are uniformly mixed and heat-melted. Hydrogen chloride is used in an amount of from 8 to 180 ppm, preferably from 20 to 75 ppm relative to glucose as the starting material. The hydrogen chloride is used preferably in the form of hydrochloric acid. If the amount of hydrogen chloride is less than 8 ppm, it will be extremely difficult to prevent coloring attributable to the decomposition of glucose and to bring the number average molecular weight of the condensed polysaccharide to a level of at least 1,500. The molecular weight of less than 1,500 means that the condensed polysaccharide is relatively susceptible to hydrolysis by digestive enzymes. So long as the melting method under reduced pressure at a high temperature is concerned, the decomposition rate by enzymes decreases as the molecular weight increases in the range of the number average molecular weight of the condensed polysaccharide being less than 1,500, and the decomposition rate tends to be constant at a low level in a molecular weight range of at least 1,500. Further, Furia et al. have reported that the molecular weight is at least about 1,500 in order for the polysaccharide not to be directly absorbed through a digestive tract (Furia et al., J. Amer. Oil Chem. Soc., 54, 239 1977)). Also from this viewpoint, the molecular weight should better be at least 1,500.

On the other hand, if hydrogen chloride exceeding 180 ppm is used as the catalyst, decomposition products of glucose are likely to be included in the condensed polysaccharide, and the bonding type of the glucose molecules tends to be predominantly α-bonding, whereby the condensed polysaccharide tends to be susceptible to decomposition by digestive enzymes. Thus, the hydrogen chloride concentration should be within a range of from 8 to 180 ppm.

When hydrochloric acid is employed, it is preferably used at a concentration of at most 0.5 N. If the hydrochloric acid concentration is higher than 0.5 N, the volume of hydrochloric acid to be added will be so small that it will be practically difficult to uniformly mix it with glucose. However, the concentration of hydrochloric acid to be added is not particularly restricted, and any concentration will be acceptable so long as it can be mixed uniformly with glucose. The uniform mixing serves to prevent local coloring due to acid decomposition of glucose and to prevent hydrochloric acid as the catalyst from being discharged out of the system during the reaction when it is kept under reduced pressure and thus to facilitate the dehydration condensation reaction.

Then, the molten mixture of glucose and hydrochloric acid is maintained under reduced pressure at a temperature of from 145° to 225° C. for a period of not longer than 30 minutes for dehydration condensation. During this reaction, if the reaction temperature is lower than 145° C., it is hardly possible to attain the minimum molecular weight of 1,500 required for the condensed polysaccharide to be hardly hydrolyzable by enzymes as mentioned above, even when other reaction conditions are adjusted. On the other hand, if the reaction temperature exceeds 225° C., coloring tends to be substantial. Thus, the reaction temperature should preferably be within a range of from 145° to 225° C. On the other hand, when application to food products is taken into account, the number average molecular weight is preferably at 1,500 but close to 1,500, since if the molecular weight is too large, the solubility in water tends to be poor, whereby the range of applications will be narrow. For this purpose, the reaction time should preferably be not longer than 30 minutes, more preferably from 5 to 18 minutes. With respect to the degree of vacuum during the reaction, the higher the degree of vacuum is, the more readily the reaction proceeds, since the reaction is a dehydration condensation reaction. However, it is not required to make the vacuum degree so high, and the vacuum degree may be within a range which is commonly employed for an industrial operation.

With respect to the following items, the change with time were investigated for the reaction of this glucose+hydrochloric acid system:

(i) The number average molecular weight as measured by a reduction terminal method.

(ii) pH of a 5 wt % aqueous solution (iii) Amount of remaining glucose as measured by an enzyme method (iv) Weight ratio (yield) of the condensed polysaccharide as calculated from the molecular weight distribution (v) Degree of coloring (absorbance of a 5 wt % aqueous solution at 400 nm)

(vi) Chlorine ion concentration

From this investigation, the reaction was found to proceed as follows. At the time when the very small amount of hydrochloric acid and glucose are uniformly mixed and heat-melted, hydrochloric acid is present in an amount of at least 90% of the initially added amount, and the pH is at most 4. However, when the system is transferred to the vacuumed high temperature condition for the dehydration condensation, the pH gradually increases as hydrochloric acid is grandually removed out of the system. Here, the reason why hydrochloric acid does not rapidly decrease is considered attributable to a clathratet inclusion action of the saccharide. Hydrochloric acid decreases as time passes and eventually almost completely removed out of the system. On the other hand, however, acid decomposition products of glucose gradually increases accompanied by coloring. Accordingly, the pH initially increases, then reaches the maximum value and then gradually decreases. The pH at the maximum value is usually from 4.0 to 6.5, where the residual hydrochloric acid is at a level of from 5 to 50% of the initially added amount. As hydrochloric acid serves as a catalyst, the molecular weight and the yield of the condensed polysaccharide sharply increases at the initial stage when hydrochloric acid is present in a substantial amount and gradually increases after the reaction time when the pH reaches the maximum value. The amount of glucose changes exactly in a reversed fashion. These changes are basically the same when mannose, galactose, xylose, arabinose or a mixture thereof is used as the starting material instead of glucose. When application to a food extender or food excipient as mentioned above is taken into account, it is desired that the condensed polysaccharide has minimum coloring, the pH is close to neutral, the yield is high, the molecular weight is at least 1,500 and close to 1,500, and the condensed polysaccharide is hardly decomposable by digestive enzymes. The reaction conditions in the present invention are selected to simultaneously satisfy these requirements. In particular, the optimum reaction time of from 5 to 18 minutes corresponds to from 1.5 to 2 times the reaction time to reach the above-mentioned maximum value of the pH, which is an important point along with the amount of hydrogen chloride to be added. By this optimum reaction time, almost all the added hydrogen chloride is removed out of the system, whereby the condensed polysaccharide will be neutral or weakly acidic.

The process for producing a condensed polysaccharide established by the present inventors has several points improved over the conventional melting method conducted in vacuum at a high temperature. Specifically, there may be mentioned (i) that the amount of the catalyst may be extremely small, whereby formation of decomposition products can be kept at a low level, (ii) that the hydrogen chloride catalyst is volatile and is removed out of the system during the reaction, and consequently, the condensed polysaccharide will be neutral to weakly acidic and does not have an acidic taste, (iii) that the reaction can be completed in a short period of time, whereby coloring due to decomposition is minimum, and as the most distinctive feature, (iv) that the condensed polysaccharide is hardly hydrolizable by various decomposing enzymes concerned with digestion. With respect to item (iv), it should be added (1) that if the molecular weight of the condensed polysaccharide is less than 1,500, the hydrolysis by digestive enzymes decreases as the molecular weight increases, but when the molecular weight is at least 1,500, the hydrolysis will be constant at a low level, and (2) that the smaller the amount of hydrogen chloride, the richer the $\beta$-bonding as the bonding type of the residual groups. According to the present invention, the synergistic effect of both of the above-mentioned characteristics has been successfully induced by using a very small amount of hydrogen chloride as the catalyst. Thus, the condensed polysaccharide according to the present invention has a characteristic that it is more hardly hydrolyzable by various decomposing enzymes than the condensed polysaccharides prepared by conventional melting methods of the same type so far reported.

According to the methylation analysis, the periodic acid oxidation and the IR analysis, the condensed polysaccharide obtained by the process of the present invention has a highly branched structure containing predominantly the 1→6 bond in the case of an aldohexose starting material or the 1→4 bond in the case of aldopentose starting material as the bonding type of the residual groups. The average polymerization degree is from 9 to 25 as measured by determination of reducing end-group. Further, this product is a low calorie saccharide which is colorless or slightly yellow, tasteless or slightly sweet and odorless. The product is very well soluble in water and stable under heat and within a wide range of pH. Further, since the product is hardly decomposable by various enzymes, its anti-dental caries effect is expected. Thus, the product is expected to be useful for a wide range of applications in the field of food products, for instance, as a low calorie food extender or excipient as mentioned above.

Now, the present invention will be described in further detail with reference to Examples. However, it should be understood that the present invention is by no means restricted to such specific Examples.

EXAMPLE 1

A uniform mixture of 30 g of hydrous glucose and 0.3 ml of 0.1 N hydrochloric acid was divided into three portions, which were heat-melted and then maintained at 160° C. under 0.1 mmHg for 10, 16 and 28 minutes, respectively, for dehydration condensation. These reaction products are designated as A-10, A-16. A-28, respectively. The pH of a 5% aqueous solution, the specific rotatory power $[\alpha]_d^{20}$ of a 1% aqueous solution, the number average molecular weight as measured by the reducing end-group method, the amount of remaining glucose as measured by an enzymic method (glucose oxidase) and the intrinsic viscosity ($\eta$) of each product are shown in Table 1.

TABLE 1

| Sample | pH (5%) | $[\alpha]_D^{20}$ (1%) | Molecular weight | [n] (dl/g) | Amount of remaining glucose |
|---|---|---|---|---|---|
| A-10 | 5.0 | 61° | 1610 | 0.030 | 3.1% |
| A-16 | 4.6 | 61° | 2440 | 0.036 | 1.8% |
| A-28 | 4.3 | 58° | 3130 | 0.050 | 0.7% |

The above samples A-16 and A-28 as well as condensation polysaccharides prepared by conventional melting methods i.e. the method by Liskowitz et al wherein the dehydration condensation was conducted in an argon stream (J. W. Liskowitz et al., Carbohydrate Res., 5, 245 (1967)), the method by Mora et al. wherein phosphorous acid was used as a catalyst, the method by O'Colla wherein a strongly acidic ion exchange resin was used as a catalyst and the method by Nakamura wherein concentrated sulfuric acid was used as a catalyst (Tadashi Nakamura, Kogyo Kagaku Zasshi, 63, 1769 (1960)), were subjected to hydrolytic reactions with the decomposing enzymes concerned with digestion as identified in Table 2. Firstly, 20 mg of each condensed polysaccharide was dissolved in 5 ml of a buffer solution together with each enzyme, and the solution was kept under each condition as identified in Table 2, whereby the change with time of the reducing power was examined. When the reducing power reached equilibrium, the hydrolytic decomposition rate as glucose was calculated from the equilibrium value. The enzymatic reaction temperature was 37° C. in all cases except for glycoamylase (30° C.) and $\beta$-amylase (28° C.). In Table 2, the rabbit's small intestine crude enzyme is the one prepared from a rabbit's small intestine by the Cogoli's method (A. Cogoli et al., Eur. J. Boichem. 30, 7 (1972)) and contains all enzymes present in a rabbit's small intestine. The results are shown in Table 3.

TABLE 2

| Enzyme | Enzymatic decomposition reaction conditions | |
|---|---|---|
| α-amylase (Sigma, Human Salivary) | 52 units, 0.05 M phosphoric acid buffer | (pH 6.8) |
| α-amylase (Sigma, Hog pancreas) | 113 units, 0.05 M phosphoric acid buffer | (pH 6.8) |
| α-amylase (Seikagaku Kogyo, B. subtilis) | 95 units, 0.05 M phosphoric acid buffer | (pH 6.0) |
| α-amylase (Sigma, B. subtilis) | 100 units, 0.05 M phosphoric acid buffer | (pH 6.8) |
| α-amylase (Sankyo, A. oryzae) | 110 units, 0.05 M acetic acid buffer | (pH 5.4) |
| α-amylase (Novo, Thermamyl) | 100 units, 0.05 M phosphoric acid buffer | (pH 6.0) |
| α-amylase (Novo, BAN) | 100 units, 0.05 phosphoric acid buffer | (pH 6.0) |
| α-amylase (Novo, Fangamil) | 100 units, 0.05 M acetic acid buffer | (pH 4.5) |
| Glucoamylase (Seikagaku, R. niveus) | 40 units, 0.05 M acetic acid buffer | (pH 4.5) |
| Glucoamylase (Nova, AMG) | 30 units, 0.05 M acetic acid buffer | (pH 4.5) |
| β-amylase (Signa, sweet potato) | 0.3 mg, 0.05 M acetic acid buffer | (pH 5.0) |
| Isoamylase (Hayashibara) | 0.02 mg, 0.05 M acetic acid buffer | (pH 3.5) |
| Pluranase (Hayashibara) | 0.1 mg, 0.05 M acetic acid buffer | (pH 5.5) |
| Pluranase (Novo, Promozyme) | 4 units, 0.05 M acetic acid buffer | (pH 5.5) |
| Dextranase (Novo) | 4 units, 0.05 M acetic acid buffer | (pH 5.5) |
| Rabbit's small intestine crude enzyme | 100 units[a], 0.05 M phosphoric acid buffer | (pH 6.8) |

[a]Activity as a sucrase-isomaltase complex

TABLE 3

| Enzymes | Hydrolytic decomposition rate (%) | | | | | |
|---|---|---|---|---|---|---|
| | A-16 | A-28 | Liskowitz | Mora | O'Colla | Nakamura |
| α-amylase (Human Salivary) | 0.7 | 0.9 | 2.7 | 2.7 | 3.9 | 3.8 |
| α-amylase (Hog pancreas) | 1.1 | 1.0 | 3.0 | 0.4 | 3.0 | 1.9 |
| α-amylase (Seikagaku Kogyo, B. subtilis) | 0.4 | 0.5 | 5.8 | 1.9 | 4.5 | 1.7 |
| α-amylase (Sigma, B. subtilis) | 0.7 | 0.8 | 7.1 | 8.1 | 0.3 | 6.2 |
| α-amylase (A. oryzae) | 0.8 | 0.4 | 2.6 | 6.2 | 2.4 | 1.7 |
| α-amylase (Thermamyl) | 0.4 | 0.7 | 3.9 | 8.0 | 6.6 | 0.9 |
| α-amylase (BAN) | 1.2 | 1.5 | 6.5 | 5.7 | 2.8 | 1.0 |
| α-amylase (Fangamil) | 9.8 | 7.0 | 13.6 | 16.1 | 10.7 | 10.2 |
| Glucoamylase (R. niveus) | 6.1 | 5.7 | 7.9 | 9.5 | 6.1 | 10.1 |
| Glucoamylase (AMG) | 11.6 | 12.8 | 32.0 | 50.4 | 19.5 | 12.6 |
| β-amylase | 2.0 | 1.2 | 3.6 | 5.9 | 4.3 | 3.0 |
| Isoamylase | 3.8 | 4.0 | 12.5 | 20.8 | 7.8 | 5.4 |
| Pluranase (Hayashibara) | 3.0 | 3.7 | 6.9 | 17.0 | 2.6 | 3.5 |
| Pluranase (Novo) | 13.9 | 15.1 | 21.1 | 41.5 | 15.6 | 12.3 |
| Dextranase | 11.3 | 10.7 | 16.0 | 20.6 | 10.9 | 11.4 |
| Rabbit's small intestine crude enzyme | 8.2 | 5.3 | 12.6 | 20.8 | 10.1 | 18.7 |

Samples A-16 and A-28 were found to be hardly susceptable to hydrolysis as compared with other samples.

EXAMPLE 2

10 g of water-containing glucose and 0.22 ml of 0.05 N hydrochloric acid were thoroughly mixed and heat-melted, and then maintained at 175° C. under 5 mmHg for 10 minutes for dehydration condensation. The product had a molecular weight of 2640, $[\alpha]_D^{20}$ of 59.7° and $[\eta]$ of 0.037 dl/g and was tasteless, odorless and white. A part of the product was dissolved in an artificial gastric juice (pH 1.2) to a concentration of 2% and maintained at 37° C., and another part was dissolved in a McIlvaine buffer solution of pH 3 to a concentration of 2% and maintained at 100° C., whereupon the changes with time of the hydrolytic decomposition rates thereof were investigated. The results are shown in Table 4.

TABLE 4

| | Hydrolytic decomposition rate (%) | | | | |
|---|---|---|---|---|---|
| Conditions | At initiation | 30 min. later | 60 min. later | 2 hrs. later | 4 hrs. later |
| pH 1.2, 37° C. | 0 | 0.3 | 0.7 | 1.3 | 3.0 |
| pH 3.0, 100° C. | 0 | 0.1 | 0.4 | 0.9 | 2.2 |

EXAMPLE 3

To 10 g of anhydrous glucose, 0.05 N hydrochloric acid was added to obtain mixtures having hydrogen chloride concentrations of 6, 37, 91, 146 and 193 ppm, respectively, which were subjected to dehydration condensation at 170° C. under 10 mmHg. These condensed polysaccharides are designated as B-6, B-37, B-91, B-146 and B-193, respectively. However, the respective reaction times were adjusted so that the degrees of coloring became substantially the same. These five types of samples were subjected to hydrolysis in the same manner as in Example 1 with pluranase (Novo, Promozyme) and the rabbit's small intestine crude enzyme. The results are shown in Table 5.

TABLE 5

| Sample | Reaction time (min) | Molecular weight | $[\alpha]_D^{20}$ | Hydrolytic decomposition rate (%) | |
|---|---|---|---|---|---|
| | | | | P | R |
| B-6 | 25 | 1310 | 75 | 16.3 | 12.7 |
| B-37 | 14 | 1960 | 58 | 12.5 | 6.9 |
| B-91 | 10 | 2410 | 64 | 9.3 | 5.0 |
| B-146 | 9 | 2070 | 68 | 14.0 | 8.8 |
| B-193 | 6 | 2140 | 66 | 18.6 | 13.2 |

P:Pluranase
R:Rabbit's small intestine crude enzyme

EXAMPLE 4

When the hydrolysis of a low calorie saccharide in a living body is taken into account, the decomposition rate has an important significance. Therefore, sample A-16 of Example 1, sample B-37 of Example 3, polydextrose as a commercially available low calorie saccharide and a biochemical soluble starch (Merch & Co.) as a control were treated with various decomposing enzymes concerned with digestion in a living body as identified in Table 2 under the same condition, whereby the initial decomposition rates were investigated. In Table 6, ratios of the decomposition rates of the respective low calorie saccharides to the decomposition rate of the soluble starch are presented by percentage.

TABLE 6

| Enzymes | Initial hydrolytic decomposition rate (%, relative to starch) | | |
|---|---|---|---|
| | A-16 | B-37 | Poly-dextrose |
| α-amylase (Human Salivary) | 0.3 | 0 | 0 |
| α-amylase (Hog pancreas) | 0 | 0 | 0 |
| α-amylase (Seikagaku Kogyo, B. subtilis) | 1.6 | 1.1 | 1.3 |
| α-amylase (Sigma, B. subtilis) | 0 | 0 | 0 |
| α-amylase (A. oryzae) | 0 | 0 | 0 |
| α-amylase (Thermamyl) | 0 | 0 | 0 |
| α-amylase (BAN) | 0 | 0.1 | 0 |
| α-amylase (Fangamil) | 0 | 0 | 0 |
| Glucoamylase (R. niveus) | 0 | 0 | 0 |
| Glucoamylase (AMG) | 0.1 | 0 | 0 |
| β-amylase | 12.6 | 7.4 | 16.3 |
| Isoamylase | — | — | — |
| Pluranase (Hayashibara) | 0.5 | 0.5 | 1.5 |
| Pluranase (Novo) | 0.6 | 0.9 | 0.5 |
| Dextranase | 0 | 0 | 250 |
| Rabbit's small intestine crude enzyme | 0 | 0 | 15.5 |

The products of the present invention exhibit remarkable differences from the commercial product in the cases of dextranase and the rabbit's small intestine crude enzyme.

EXAMPLE 5

Glucose, mannose, galactose, xylose and arabinose were mixed in the proportions as identified in Table 7, and to 10 g of each mixture, 0.1 ml of 0.1 N hydrochloric acid was uniformly mixed. Each mixture was heat-melted and then subjected to dehydration condensation at 180° C. under 3 mmHg. Then, with respect to each condensed polysaccharide, the average polymerization degree as measured by the reducing end-group method, the pH of a 5% aqueous solution, the weight ratio (yield) of the condensed polysaccharide as calculated from the molecular weight distribution and the hydrolytic decomposition rate by the rabbit's small intestine crude enzyme were investigated in the same manner as in Example 1. The results are shown in Table 7.

TABLE 7

| Mixing ratio of starting materials | Reaction time | Average polymerization degree | pH | Hydrolytic decomposition rate | Yield |
|---|---|---|---|---|---|
| Glucose:mannose = 1:1 | 15 min | 15.0 | 5.1 | 3.1% | 93.0% |
| Glucose:xylose = 1:2 | 8 min | 18.5 | 4.7 | 1.3% | 94.7% |
| Arabinose | 7 min | 21.2 | 4.9 | 0 | 98.6% |
| Glucose:galactose = 1:1 | 20 min | 9.8 | 4.6 | 2.6% | 91.9% |
| Xylose | 10 min | 16.7 | 5.0 | 0 | 96.1% |
| Glucose:arabinose = 2:1 | 15 min | 23.1 | 5.3 | 4.8% | 97.9% |
| Mannose:galactose = 1:1 | 15 min | 12.3 | 4.5 | 0 | 90.3% |

Condensed polysaccharides of mannose, galactose, xylose and arabinose are not decomposed by the rabbit's small intestine crude enzyme. Therefore, when such a saccharide is added to glucose, followed by the reaction, the obtained condensed polysaccharide is more hardly hydrolyzable by the rabbit's small intestine crude enzyme than the case where glucose alone is reacted.

What is claimed is:

1. A process for producing a condensed polysaccharide which comprises heat-melting a mixture consisting essentially of a material which liberates hydrogen chloride in a concentration from 8 to 180 ppm and at least one compound selected from the group consisting of glucose, mannose, galactose, xylose and arabinose followed by dehydration condensation under reduced pressure.

2. The process according to claim 1, wherein the said material is hydrochloric acid.

3. The process according to claim 2, wherein the concentration of hydrochloric acid is at most 0.5 N.

4. The process according to claim 1, wherein the dehydration condensation is conducted at a temperature of from 145° to 225° C.

5. The process according to claim 1, wherein the dehydration condensation is conducted for a period of at most 30 minutes.

6. The process according to claim 1, wherein the condensed polysaccharide is a low calorie food product.

* * * * *